United States Patent
Lin

(10) Patent No.: US 8,369,614 B2
(45) Date of Patent: Feb. 5, 2013

(54) EDGE CONTROL IN A DIGITAL COLOR IMAGE VIA TONE AND SIZE DEPENDENT DILATION OF PIXELS

(75) Inventor: Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 385 days.

(21) Appl. No.: 12/757,380

(22) Filed: Apr. 9, 2010

(65) Prior Publication Data

US 2011/0249895 A1 Oct. 13, 2011

(51) Int. Cl.
G06K 9/36 (2006.01)

(52) U.S. Cl. ......... 382/162; 382/257; 382/286; 382/275

(58) Field of Classification Search ............. 382/257, 382/162, 266, 275
See application file for complete search history.

(56) References Cited

U.S. PATENT DOCUMENTS

| | | | |
|---|---|---|---|
| 5,142,589 A * | 8/1992 | Lougheed et al. ............ 382/102 |
| 6,144,461 A | 11/2000 | Crean et al. | |
| 6,167,166 A | 12/2000 | Loce et al. | |
| 6,243,499 B1 | 6/2001 | Loce et al. | |
| 2006/0045376 A1 * | 3/2006 | Kwon ........................... 382/266 |
| 2008/0260284 A1 | 10/2008 | Lin et al. | |
| 2009/0153923 A1 | 6/2009 | Lin | |
| 2010/0054583 A1 * | 3/2010 | Huang et al. ................. 382/163 |

* cited by examiner

*Primary Examiner* — Jon Chang
(74) *Attorney, Agent, or Firm* — Philip E. Blair; Fleit Gibbons Gutman Bongini & Bianco P.L.

(57) ABSTRACT

What is disclosed is a novel system and method for calculating an amount of a total dilation for reverse objects in order to compensate for fill-in effects to improve quality of a digital image in a digital document reproduction system. In a manner more fully described herein, a tone-dependent compensation factor is determined which is a function of a gamma-corrected background density. The tone-dependent compensation factor is then used to scale the maximum base dilation to produce an amount of total dilation. The total dilation amount is applied to contone pixels along an edge of the reverse object to compensate for fill-in artifact effects. By adjusting pixels along the edges of reverse objects by the total dilation determined hereby, the sharpness (or crispness) of reverse fine features is improved on sweeps and for hue shifts at the edges of the reverse objects on backgrounds of more than one color separation.

20 Claims, 6 Drawing Sheets

EDGE CONTROL IN A DIGITAL COLOR IMAGE VIA TONE AND SIZE DEPENDENT DILATION OF PIXELS

TECHNICAL FIELD

The present invention is directed to systems and methods for reducing fill-in artifacts to improve image quality of reverse fine features in a digital document reproduction system.

BACKGROUND

In the process of image formation, there are difficulties associated with rendering certain reverse features on an image output medium. Reverse features are those in which white, near-white, or essentially transparent images, are to be disposed on the output image receiving medium within an area including a dark or color background. Conventional methods for enhancing image quality in produced images tend to lead to a blending of individual opposing edges that wash out a small text font or fine line object image particularly as the size of the image is reduced. Depending on the image formation method employed by an image forming device, and on a dot-per-inch resolution for the formed image, an ability to render and/or print finely-defined features, particularly in reverse printing may be affected. A particular image forming methodology by which such images maybe rendered less perceptible as the width of fine lines or the size of fonts are reduced involves electrostatic and/or xerographic image formation.

In many xerographic image forming systems and/or devices, for example, fill-in artifacts which have been included to enhance crispness often remain perceptible when printing reverse fine features, such as fine lines or small text fonts, in white on a dark or color background. These fill-in artifacts may obliterate the fine lines and/or small text fonts. Such problems associated with printing reverse fine features are increasingly pronounced in circumstances when, for example, high addressability halftones are employed at the edges of adjacent background pixels, and/or when the background color contains an excessive toner amount. Bleed of the fine edge adjustments into the white fine line or small text font areas result in the reverse fine features becoming indistinct or difficult to recognize and/or read. This reduces the sharpness or crispness of the output image. Sharpness is generally an important metric for evaluating image quality. FIGS. 1A-C are demonstrative of this problem. FIG. 1 is an exemplary line of white text on a dark color background. FIG. 2 is an unmodified line of white on a light color background. FIG. 3 is an unmodified set of radiating lines with varying pixel widths. As can be seen, as fine lines become thinner and small text is reduced below a threshold object size, the sharpness of the images decreases, i.e., the visibility of individual features decreases dramatically.

Image forming systems enhance sharpness by various methods including modifying edge pixels of an object to employ high addressability halftone screens, while still employing base dot screens for the non-edge pixels. Such methods can be effective in enhancing sharpness of the formed image in reverse printing lines and text characters when the involved object is white, and of normal-to-large size, and the background is dark or darkly colored. High addressability halftones are applied to the colored edge pixels that belong to the background to enhance this sharpness. However, for small text fonts and fine lines, simple readability becomes a more important attribute than individual object or character sharpness. Conventional solutions often address such problems by disabling the high addressable halftone cells for reverse objects when the objects are below a certain size threshold. This approach leaves white areas more perceptible but these objects may be blurry when the background is light or a lighter color. Other methods involve globally thickening a stroke size for thin reverse lines. However, such methods also tend to thicken the positive or color line.

U.S. Patent Publication No. 2009/0153923, entitled: "Methods And Systems For Rendering And Printing Reverse Fine Features" disclosed a method for calculating a base dilation amount applied to all background colors. However, in this context, a one-size-fits-all solution is not optimal. If a base dilation amount is applied to all background colors for the same fine line, one can observe that dilation does not open up the thin line sufficiently enough in a dark background while opening up the line too much in a light background. Consider, for instance, a thin line located on a dark (100%) to light (0%) sweep. The fill-in effect will not be constant. This non-linearity can also be observed as color halos near edges of small reverse fine-featured objects. For instance, given a document image, such as a PDL page, that has some relatively small white text lines on top of a red box wherein CMYK= (0,255,128,0), if we dilate a small but substantially similar amount for Magenta and Yellow in the rasterized image, a white gap can be observed if the area of Magenta separation gets filled too much. Stated differently, with the same amount of dilation, the white gap in the Magenta separation will be narrower than in the Yellow separation. If we increase the dilation amount for this same small white text line such that the white gap in the Magenta separation is widened sufficient to avoid the fill-in artifact effect, the same amount of dilation may be too much in the Yellow separation.

Accordingly, what is needed in this art are increasingly sophisticated systems and methods which can compensate for fill-in artifact effects and which can account for both object size and background color per color separation to improve image quality in digital document reproduction devices.

INCORPORATED REFERENCES

The following U.S. patents, U.S. patent applications, and Publications are incorporated herein in their entirety by reference.

"Methods And Systems For Rendering And Printing Reverse Fine Features", U.S. Patent Publication No. 2009/0153923, to Guo-Yau Lin.

"Edge Contrast Adjustment Filter", U.S. Patent Publication No. 2008/0260284, to Lin et al.

"Tagging of Antialiased Images", U.S. Pat. No. 6,243,499, to Loce et al.

"Method to Enable the Recognition and Rendering of Antialiased Images", U.S. Pat. No. 6,167,166 to Loce et al.

"Method for Generating Rendering Tags to Facilitate the Printing of Antialiased Images", U.S. Pat. No. 6,144,461, to Crean, et al.

BRIEF SUMMARY

What is disclosed is a novel system and method for calculating an amount of a total dilation for reverse objects in order to compensate for fill-in effects to improve quality of a digital image in a digital document reproduction system. In a manner more fully described herein, a tone-dependent compensation factor is determined which is a function of a gamma-corrected background density. The tone-dependent compensation factor is then used to scale the maximum base dilation to produce an amount of total dilation. The amount of total dilation is then applied to contone pixels along an edge of the reverse object to compensate for fill-in artifact effects. By adjusting pixels along the edges of reverse objects by the amount of total dilation, the sharpness (or crispness) of reverse fine features is greatly improved on sweeps and for hue shifts at the edges of the reverse objects on backgrounds of more than one color separation.

In one example embodiment, the present method for reducing a fill-in effect for reverse objects in a document image involves the following. First, an image of a document is received from an image input device. At least one reverse object is identified in the received image having an edge comprising pixels in a region of transition. An amount of a maximum base dilation, $D_{max}$, is determined which represents the maximum base amount that the edge of the object can be dilated. An amount of a size-dependent dilation, $D_{sd}$, is determined. The size-dependent dilation represents an amount of a dilation to be applied to the object when the background is in the range of a highlight color. A background density, $B_d$, is determined based upon a digital count of a background color of the region of transition. A gamma correction is applied to the background density to produce a gamma-corrected background density, given $(B_d)^\gamma$, where $\gamma$ is a tone-dependent gamma correction determined for a given color separation. A tone-dependent compensation factor is then calculated as a function of the gamma-corrected background density. The amount of size-dependent dilation is then scaled by the tone-dependent compensation factor to obtain an amount of a total dilation, $D_{total}$. The total dilation amount (in pixels) is the total amount of dilation to be applied. Contone pixels in the region of transition can then be dilated by the amount of total dilation. By adjusting the edges of reverse objects by the amount of total dilation (in pixels), the sharpness (or crispness) of reverse fine features of the object is greatly improved. The process is repeated for other edges of other reverse object. The document image can then be provided to an image output device. Various embodiments have been disclosed.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1A:
FIG. 1A illustrates a first unmodified exemplary line of white text on a dark color background.
Figure 1B:
FIG. 1B illustrates a second unmodified exemplary line of white text on a light color background.
Figure 1C:
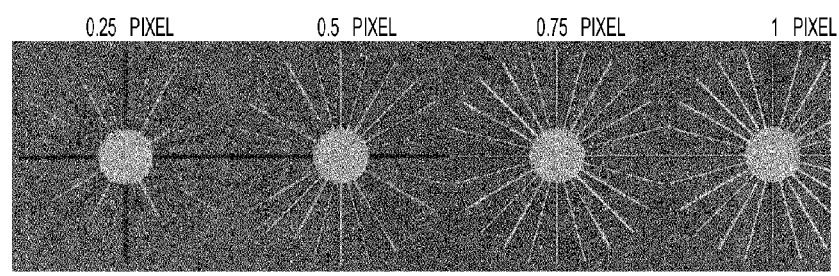
FIG. 1C illustrates an unmodified exemplary set of radiating lines of varying pixel widths.

What is disclosed is a novel system and method for calculating an amount of a total dilation for reverse objects in order to compensate for fill-in effects to improve quality of a digital image in a digital document reproduction system. A tone-dependent compensation factor is determined as a function of the background density through a gamma correction curve. The tone-dependent compensation factor is used to scale the maximum base dilation to obtain an amount of total dilation, where the maximum base dilation amount is a function of the size of the reverse object. Contone pixels in a region of transition along an edge of the reverse object are dilated by the amount of total dilation to compensate for fill-in artifact effects. By adjusting the edges of reverse objects by the amount of total dilation, the sharpness (or crispness) and the consistency of the edge color of reverse fine features is greatly improved.

It should be understood that one of ordinary skill in this art would be readily familiar with many facets of color science and image processing and other techniques and algorithms commonly found in the color science and document reproduction arts. Those of ordinary skill would be familiar with the text: *"Digital Color Imaging Handbook"*, $1^{st}$ Ed., CRC Press (2003), ISBN-13: 97808-4930-9007, and *"Control of Color Imaging Systems: Analysis and Design"*, CRC Press (2009), ISBN-13: 97808-4933-7468, both of which are incorporated herein in their entirety by reference. One of ordinary skill would also be knowledgeable about computer science and hardware and software systems and methods sufficient to implement various aspects of the methods described herein in their own environments without undue experimentation.

Non-Limiting Definitions

A "pixel" (or picture element) is the smallest addressable element of a raster image. Pixels are associated with a value defined in terms of, for example, a coordinate in color space or a mathematical transformation thereof, intensity, lightness, brightness, and the like. The word pixel is derived from a contraction of 'pix' ("pictures") and 'el' (for "element").

A "image of a document" or "document image" refers to an electronic version of a document containing objects, as defined herein further. Various image input devices can generate a digital image of a document. Digital images can be characterized by a plurality of pixels and by a number of bits-per-pixel which defines a color depth of a given pixel, i.e., the number of colors that pixel can represent.

A "contone pixel" is a pixel in a contone image having a continuous-tone value. One of ordinary skill would appreciate that a contone image is one where each color in the image is reproduced as a single tone and not as discrete halftones, such as one single color for monochromatic prints or a combination of halftones for color prints. The most common contone images are digital photographs. Film is generally considered a halftone medium.

An "object" means color critical content contained with an image of a document such as: graphics, photos, line art, text, and the like, or any combination thereof. Each page of the document can may contain a plurality of different objects. Objects can be classified into several generic categories: contone objects, text objects, line art, graphic objects, and solid fill objects. Contone objects are objects within a document image generally comprising pixels having a range of shades corresponding to a single color. Color contone objects are contone objects generally comprising pixels having a range of shades corresponding to more than one color. Text objects are objects generally comprising alphanumeric characters or other character-based representations in pixels of a single color, typically black on a white background. Color text objects are text objects in more than one color. Line Art and Graphic objects are objects generally comprising a relatively large number of pixels arranged to form a geometric shape or graphic. Solid fill objects are objects generally comprising pixels arranged to form a geometrical shape having a plurality of edges. An example solid fill object is an area with the same color throughout such as, for instance, a solid multi-sided block within the document image. Monochrome solid fill objects are solid fill objects generally comprising pixels in a single color. Color solid fill objects are solid fill objects generally comprising pixels in more than one color. Many of these objects are defined in a Page Description Language (PDL) which describes the appearance of a printed page. A Reusable Document Component (RDC) is a form specified object within the PDL that can be cached for efficient placement. A Raster Image Processor (RIP) generates bitmap images from a PDL stream of the document image. A Page Parallel RIP (PPR) is a RIP that can simultaneously process subsets of pages from the PDL stream. Scanlines are produced as a function of raster output.

A "reverse object" refers to an object in a document image which has features in one color on a background of a different (often much darker or much lighter) color. A reverse object can be, for instance, a white or lightly colored object in an area of the document image encompassed by a black or darker colored background. A reverse object may be, for example, a black or dark colored object in an area of the document image encompassed by a white or lightly colored background. A reverse object may comprise, in whole or in part, one or more reverse fine objects.

A "reverse fine object" is an object having, at least in part, a fine feature. An example reverse fine object is a narrow line of small text font. Another example reverse fine object is a fine white or near-white line on a black background.

A "region of transition" is a region where pixels along an edge of a reverse object are transitioning from either color-to-white, white-to-color, light-to-dark, or dark-to-light transition edges. Stated in another way, these regions within the image are at boundary edge interfaces where pixel intensity tends to change rapidly.

"Gamma" is defined as a slope of an input-output curve in log-log space. One embodiment is given as:

$$\gamma = \log(V_{out})/\log(V_{in}).$$

Gamma is used to correct an input-output response to compensate for non-linearities in a given system or device, such that the end-to-end response becomes linear. This correction takes the form of a non-linear power-law relationship given by:

$$V_{out} = V_{in}^{\gamma},$$

where $V_{in}$ and $V_{out}$ are non-negative real values. Gamma compression uses a compressive non-linear power-law relationship. Gamma expansion uses an expansive non-linear power-law relationship.

A "gamma correction", in the present context, is a non-linear operator used to encode/decode luminance or tristimulus values in video and still image systems. A value of $\gamma<1$ can be referred to as an encoding gamma and the process of such encoding is called gamma compression. Various images are encoded using, for example, $\gamma \approx 0.45$. Gamma correction values less than 1 are typical of film. A value of $\gamma>1$ can be referred to as a decoding gamma. The process of decoding is called gamma expansion. Various images are decoded using, for example, $\gamma \approx 2.2$. Gamma values greater than 1 are typical of reversal film (slides). For computers, a gamma correction applies an inverse luminance curve to a monitor's native gamma. As such, tones at the extremes (darkness and lightness) are not as affected while mid-tones are enhanced. One reason a gamma correction is used is because the input signal sent to a monitor, i.e., voltage level, is not sufficiently high at the output to create a bright enough image making the image appear dark or darker. By applying a gamma correction to the display, brightness and contrast are enhanced. The end result is a more natural brightness and a better contrast level. Common gamma correction values for display devices are $\gamma \approx 1.8$ to 2.2. The interested reader is directed to the above-referenced text: "*Digital Color Imaging Handbook*", Chapter 5.8, for an explanation of gamma for a CRT.

The present method utilizes a tone-dependent gamma correction ($\gamma$). One example algorithm for producing a tone-dependent gamma correction for a given color separation using the following:

Generate a test pattern that has sections of constant color (from lightest to darkest), using for example Cyan. In each section, draw a 1 pixel-wide line (preferably white) on the darker background.

Using the techniques described herein further, dilate the pixels along the edge of the 1 pixel-wide lines using a starting value for gamma, for example, $\gamma=1.0$. Print the test pattern. The white lines will have been dilated a bit differently in various sections of the test pattern depending on the background color density in each of those regions of transition.

Accurately measure the widths of the dilated white lines in each section of the print. This can be effectuated digitally from a scan of the printed pattern.

Compute a standard deviation for each of the line width measurements.

Repeat the above using a range of gammas such as, for example, $\gamma=1.1, 1.2, 1.3, 1.4, \ldots, 2.0$, or higher.

Find the smallest computed standard deviation. The gamma associated with that value will be optimized for this color separation (for example, Cyan).

Repeat the above for other color separations such as, for instance, Magenta, Yellow, and Black. The resulting gammas are optimized for each separation.

"Dilation", as used herein, refers to a morphological operation which, when applied to objects in a document image, causes the object to grow in size. In such a manner, the object expands or is 'dilated'. The effect of dilation is to enlarge (typically white) the object by adding pixels along a transition edge or region of transition between the identified foreground object and a background. Dilation can also be used for edge detection by subtracting the original image from the dilated image, thus highlighting only pixels added by dilation. Dilation can be performed directionally with respect to an orientation of the edge of an object within the image relative to an orientation of the document image. Grayscale dilation generally brightens an image such that brighter regions in the image surrounded by darker regions become larger in size (i.e., smaller bright spots will become larger bright spots) and darker regions surrounded by brighter regions shrink in size (i.e., smaller dark spots will disappear as they are filled-in to a surrounding intensity or color value).

"Size-dependent dilation" is an amount of an additional dilation to be applied to an object when the background color is in the range of a highlight color. The amount of size-dependent dilation, $D_{sd}$, is based upon an amount of a maximum base dilation, $D_{max}$, and object size relative to an upper and lower size threshold. In one embodiment, the size-dependent dilation is defined by the following relationships:

$$D_{sd} = D_{max} \cdot [1 - (\text{object\_size} - T_{lower}) / (T_{upper} - T_{lower})] \quad (1)$$

$$\text{if object\_size} \geq T_{upper}, \text{ then } D_{sd} = 0 \quad (2)$$

$$\text{if object\_size} \leq T_{lower}, \text{ then } D_{sd} = D_{max} \quad (3)$$

where object_size is the size of the object (in pixels), $T_{upper}$ is an upper size threshold, $T_{lower}$ is a lower size threshold, such that: $T_{lower} \leq \text{object size} \leq T_{upper}$, and $D_{max}$ is an amount of a maximum base dilation that the object can be dilated when the reverse object is on top of a highlight background. It should be appreciated that, in order to avoid size reversal problems, $D_{max} \leq (T_{upper} - T_{ower})/2$. Thresholds may be pre-defined and may further vary based upon a variety of factors such as, for example, object type, location, color, background, and the like.

"Background density" is a digital count of a background color about a region of transition which has been normalized to a value between 0 and 1 with 0 being lightest and 255 being darkest. In one embodiment, background density, $B_d$, is given by:

$$B_d = (\text{digital count})/255. \quad (4)$$

A "tone-dependent compensation factor" is a function of the gamma-corrected background density and is utilized herein to compensate for the non-linearity problem discussed in the background section hereof. In one embodiment, the tone-dependent compensation factor, TDCF, is given by:

$$TDCF = 1 + [D_{add}/D_{sd}] \cdot (B_d)^\gamma. \quad (5)$$

where $D_{add}$ is the maximum additional dilation amount to be applied when the reverse object is on top of the darkest possible shadow background, $D_{sd}$ is the amount of size-dependent dilation of Eqs. (1)-(3), $\gamma$ is the tone-dependent gamma correction determined for a given color separation, and $(B_d)^\gamma$ is the gamma-corrected background density.

"Total dilation" is the amount of total (or final) dilation (in pixels) to be applied to the object. In one embodiment, the total dilation amount, $D_{total}$, is given by:

$$D_{total} = D_{sd} \cdot TDCF. \quad (6)$$

Example values for font and line width adjustments are provided in the following table:

|  | Font (points) | Line Width (pixels) |
| --- | --- | --- |
| Lower Threshold $T_{lower}$ | 3 | 1 |
| Upper Threshold $T_{upper}$ | 12 | 4 |
| Maximum Base Dilation Amount $D_{max}$ | 0.4 | 0.4 |
| Maximum Additional Dilation Amount $D_{add}$ | 0.45 | 0.45 |
| Tone-dependent gamma correction $\gamma$ | 1.4 | 1.4 |

Miscellaneous Definitions

An "image input device" is a device capable of receiving an image and/or converting an image into a digital representation thereof. The set of image input devices is intended to encompass rasters, scanners, cameras, photography equipment, facsimile devices, and the like. Such devices may be place in digital communication with computer workstations, storage devices, networked platforms such as servers or client devices, and the like.

An "image output device" is any device capable of rendering an image of a document. The set of image output devices includes digital document reproduction equipment and other xerographic systems, photographic production and reproduction equipment, including a wide variety of marking devices as are known in the arts, capable of rendering a document image.

To "render" is to transform a signal of an image from one state to another such as, for example, receiving a signal of an image and reducing that signal to a viewable form such as a hardcopy print of the image. The term "rendering" is intended to be broadly interpreted. In one respect, rendering means reducing a signal of the document image to a hardcopy print or displaying the image on a display device such as a monitor or LCD. In another, rendering means communicating the image to another device over a network for further processing, for example. Such communication may take the form of transmitting, wirelessly or via a wire or cable, the image signal over a network such as a LAN or Internet. In yet another, rendering means storing the image to a storage device.

A "multifunction device" (MFD) generally refers to an image input device and/or an image output device, as defined above, and as are generally known and widely understood in the digital document reproduction arts. Example multifunction devices are shown and discussed with respect to the example networked computing environment of FIG. 2. Such multifunction devices generally provide a user interface (UI) such as touchscreen and a display device such for example as a CRT or LCD. Many MFDs further provide a means for user interaction such as a keyboard, keypad, touchpad, mouse, etc. Many MFDs incorporate a storage device and/or a memory and often a plurality of device controllers. Although a multifunction device is used herein to generally refer to document reproduction devices, it should be understood that the term multifunction device is intended to encompass a wide variety of devices which can be placed in digital communication over a network with one or more computer platforms and/or with other multifunction devices. In such a networked environment, various aspects of the methods provided herein will find their intended uses. It should also be understood that one or more functions, features, or capabilities of a computer platform may reside within a multifunction device.

A "networked computer platform" (NCP) is a computer system or workstation known in the arts capable of communicating with other computer systems and multifunction devices over a network. One example computer platform is shown and discussed with respect to the networked computing environment of FIG. 2. Such systems include a desktop computer, laptop computer, mainframe, a motherboard, a special purpose computer, or other dedicated hardware. Such platforms have at least a processor, memory, storage, network interface, and other software and hardware resources. A networked computer platform is capable running a server for serving that hosted service over a network. Such a computer platform is also capable of executing machine readable program instructions which, when loaded onto the computer platform and executed, cause the platform to perform one or more aspects of the methods provided herein. Any portion of a computer platform may be integrated, in whole or in part, with one or more multifunction devices.

A "storage device" refers to a device or system capable of storing documents or images. One embodiment of a storage device is a database, as are well known in the arts, placed in communication with a computer system, workstation, and/or server, that is either remote from or collocated with a device hosting a computing process that accesses and/or stores documents or images of document. Storage devices include RAM, ROM, Cache Memory, CD-ROM, DVD, flash drives, hard drives, and other volatile or non-volatile storage media.

Example Networked Environment

Figure 2:
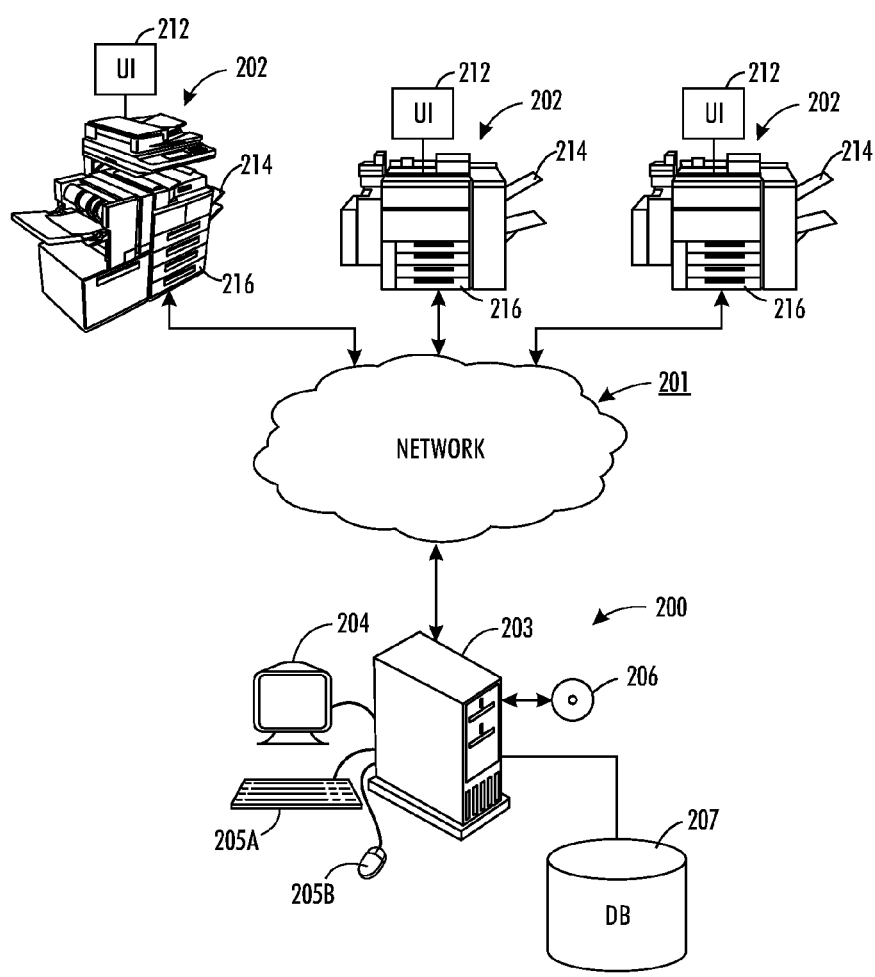
FIG. 2 illustrates a plurality of multifunction document reproduction devices placed in digital communication with a computer workstation platform wherein various aspects of the present method, as more fully described with respect to the flow diagram of FIG. 3, will likely find their intended uses.
Figure 3:
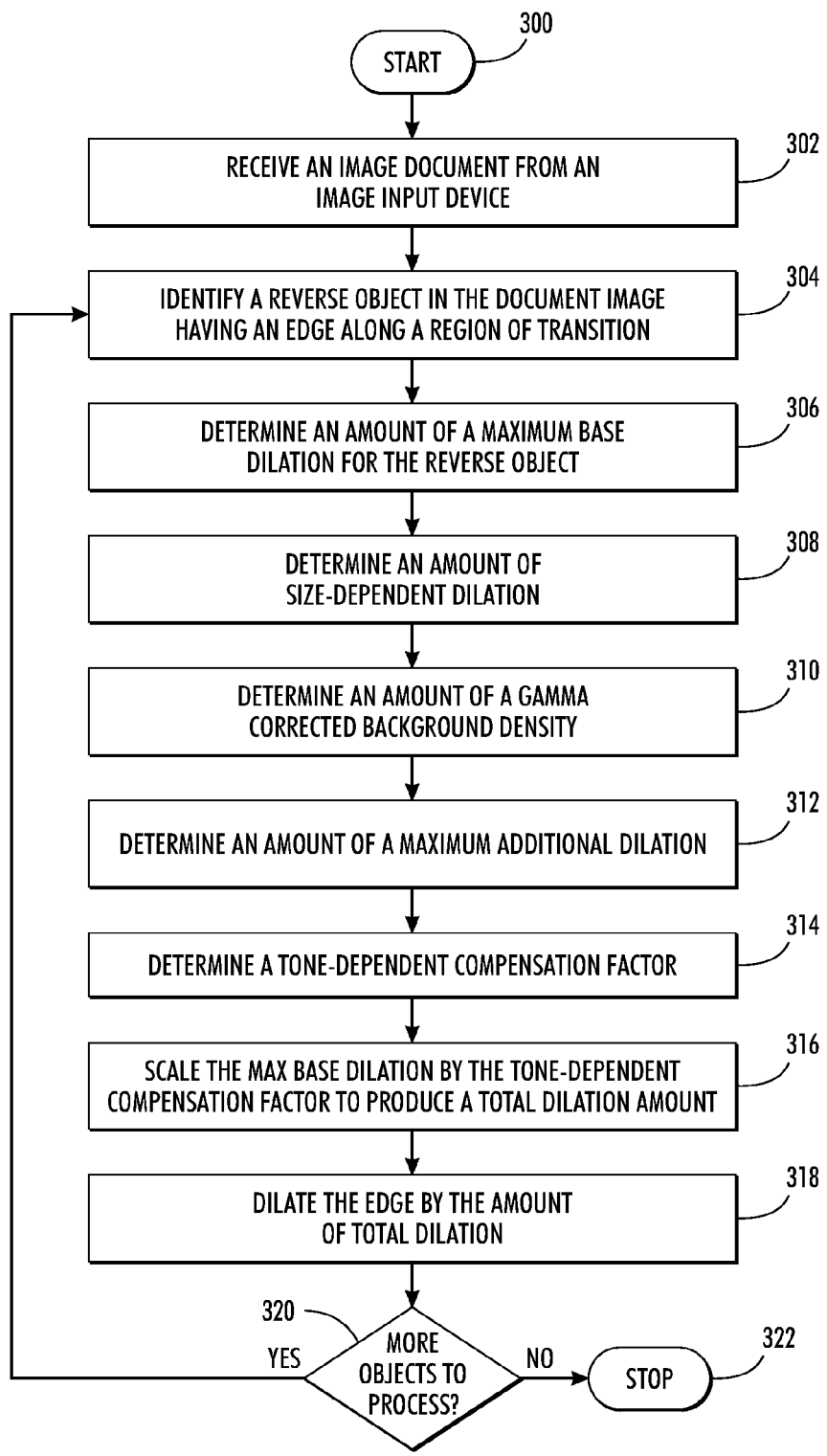
FIG. 3 is a flow diagram of one example embodiment of the present method for reducing fill-in artifacts to improve image quality of reverse fine features.

Reference is now being made to the example networked computing environment of FIG. 2 wherein various aspects of the present method, as more fully described with respect to the flow diagram of FIG. 3, are likely to find their intended uses.

In the networked environment of FIG. 2, computer platform 200 is placed in digital communication with a plurality of multifunction devices (MFDs) 202 over a network shown generally as an amorphous cloud 201. The networked computer platform and the plurality of multifunction devices collectively form a subnet of a network. Techniques for placing computer platforms in digital communication with multi-function document reproduction devices 202, are well established. Therefore, a discussion as to specific techniques for placing such computing platforms or computer workstations and multifunction devices in network communication has been omitted. Suffice it to say that data is transmitted in packets by a network of servers connected via a plurality of communication interfaces (or links). One device with access to the network 201 can communicate with another device with access to the same network using established protocols. Data is transferred between networked devices in the form of signals which may be, for example, electronic, electromagnetic, optical, or other signals. These signals are provided to a communications device such as a network server, which transmits and receives data packets by means of wire, cable, fiber optic, phone line, cellular link, RF, satellite, or any other medium or communications link known in the arts. Examples of a communications interface include a modem, a network interface (such as an Ethernet card), a communications port, a PCMCIA slot and card, etc.

Computer platform 200 is shown comprising a computer case 203 housing therein a motherboard, central processing unit (CPU), memory, one or more interfaces, at least one storage device, and a communications interface such as a network card for effectuating communication over network 201. The computing platform is also shown comprising a graphical display device 204 such as a CRT, LCD, and the like. An alphanumeric keyboard 205A and a mouse 205B provide a means for a user input. It should be appreciated that while the user interface may be used to receive parameters such as those described with respect to the flow diagram of FIG. 3, the user interface is not to be considered to be limited in its form or function by the illustration of FIG. 2. The user interface may also comprise, for example, an additional data storage medium and compatible digital data storage medium reading device, or a locally or remotely located computer or other data manipulation workstation that may be in data communication with the system in order to provide user-defined parameter for operation thereof, or otherwise for the image forming device within which the system may be located, or with which such a system may be associated.

Also shown is storage device 206 storing machine readable/machine executable program instructions for implementing various aspects of the functionality and features discussed herein further with respect to the flow diagram of FIG. 3. It should be appreciated that the computing workstation 200 has specialized software configured to display a wide variety of numeric values, text, scroll bars, dials, slideable bars, pull-down menus, selectable buttons, and the like, for entering, selecting, modifying, accepting any of the displayed information. The embodiment shown is only illustrative and may include any other functionality which any display device known in the arts is capable of displaying. The display merely illustrates one example embodiment. Software to configure a user interface or any portion thereof to display/enter/accept data is highly customizable and may be device dependent. Such software is usually considered proprietary. Therefore, a further discussion regarding specific programming techniques and software algorithms to program or otherwise configure a display device to display a certain set of settings is omitted herein. One of ordinary skill would program their display portions for a specific system in a particular networked system environment.

Such a computer platform may further include database 207, as is generally known in the arts for storage and retrieval of data. The database is one known in the arts which is capable of indexing a plurality of records, storing records, receiving and interpreting a query, and retrieving one or more records in response to a query. It should be understood that a record, as used herein, comprises any software data structure capable of containing information which can be indexed, stored, searched, and retrieved by a database engine in response to a query. The database is also capable of adding new records and updating existing records already stored. Database construction, optimization, indexing, and record retrieval techniques are well known in the arts. Thus, a further discussion as to a specific database or a specific implementation thereof is omitted. One of ordinary skill would be able to readily acquire and setup a database in their own environments and use the database to store, index, and retrieve matching records based on an ordered sequence of alphanumeric codes and provide matching record(s) to the requesting process in response to that query. Alternatively, various aspects of database 207 are placed in communication or integrated with any of the MFDs 202.

Each of the multifunction devices 202 is shown including a user interface (UI) 212 for the display thereon of icons, menus, selectable options, and other information. Such a UI or graphical user interface (GUI) may include a touchscreen display for receiving user input via a touch-sensitive surface and may further include any of a keyboard, keypad, mouse, and the like. In the illustrated networked system environment of FIG. 2, the multifunction devices are document reproduction systems which include a tray 214 for media input such as paper, and one or more media trays 216 for retaining a variety of media. Such devices are capable of performing a print/copy job function as is generally known in the document reproduction arts. Such MFDs are also capable of receiving a color image via a scanning device integrated therewith and obtaining information about pixels and image objects from the color image. Alternatively, one or more of the MFDs receive the color image from a remote device (not shown) and transmit, or help facilitate the transmission of the color image over the network. In various embodiments, the computing platform receives the obtained color image over the network from one or more of the multifunction devices.

The computer platform 200 is capable of acting as a server or running a server software program (or housing server hardware). Server software capable of hosting various applications are available from a variety of vendors in commerce.

The computer platform is further capable of creating and running service proxies for directing requests for a service application from a client device to the platform hosting the service and for redirecting responses from the host platform to the requesting device. Some or all of the embodiments and various aspects of the present method for compensating for fill-in artifact effect in a color image may be implemented in whole, or in part, in any of the systems and/or devices shown in the example networked document reproduction environment of FIG. 2.

Flow Diagram of Example First Embodiment

Although described herein as being particularly applicable to continuous-tone processing, the embodiments described herein equally apply to images wherein each color separation is treated effectively, as a gray-scale or continuous-tone image. Accordingly, references to the processing of continuous-tone or gray-scale images are intended to include the processing of color image separations as well. These contone (color) pixel levels are generally continuous from one pixel to another. In some systems, however, there are additional numeric values called "tags" associated with each pixel, which may describe how the pixel is to be rendered. For example, these tags (known also as "rendering intents" or "rendering hints") may specify to the rendering stage which halftone is to be used for a printing application. In contrast to the contone pixel levels, where color values are continuous, numerically adjacent tag values are in not general related. For example, one pixel on a border of an object may have a tag value of 5 (150 cluster dot) associated with it. Whereas, an adjacent pixel associated with another type of object may have a tag value of 6 (300 line screen). It should be appreciated that, although the tag values of 5 and 6 are close, the rendering hints they refer to provide significantly different outputs. If the digital image processing system produces the image in its original format, i.e., including all pixels, each pixel is rendered according to the correct tag. Tags or hints refer to complimentary data used in conjunction with the digital contone data to render each pixel of a digital image. Each pixel of the contone plane is assumed to have a corresponding pixel in the tag plane.

Reference is now being made to the flow diagram of FIG. 3 which illustrates one example embodiment of the present method for enhancing sharpness of a color image by reducing the perceptibility of fill-in artifacts to improve image quality of reverse fine features. Flow processing begins at 300 and immediately proceeds to step 302.

At step 302, an image of a document is received. The digital document image can be received using, for example, an image input device such as any of the multifunction devices of the example networked environment of FIG. 2. One example image input device is a document scanner that optically scans the image and converts the scanned image into a digitized format. Common examples are variations of the flatbed scanner known in the arts wherein specialized image receptors move beneath a platen and scan the media placed on the platen. Modern scanners typically use a charge-coupled device (CCD) or a contact image sensor (CIS) as the image sensing receptor which produces a signal of the scanned image. Such a signal contains digitized information about pixels and their locations within the scanned print. Another image input device is a raster image processor (RIP) which takes documents in page description language and converts them into pages of rasterized data. The image of the document may be received from the raster in the form of scanlines. Each scanline may be processed using, for example, a sliding window employed to categorize a plurality of reverse objects encountered in each scanline as either white (or near-white) objects or non-white (or dark colored) objects. This categorization may be based upon contone value where objects with a contone data value below a pre-set threshold are defined, for example, as white and objects with a contone data value above the pre-set value are defined as non-white. As each object is encountered in the scanline(s) being processed, edges associated with objects may be added as individual events to a list that may be referenced to, in turn, determine how each event should be processed. Each object may be determined to have an object size which may be different for each object. At least one edge of each listed event may be modified based on the object size or other criteria.

At step 304, a reverse object is identified in the received document image. At least one edge of the identified reverse object comprises, at least in part, pixels determined to be in a region of transition. The edge of the identified reverse object in the received document image is intended to be dilated using the teachings hereof. Methods for analyzing an image to determine one or more reverse objects contained therein such as, for instance, small text fonts and/or fine narrow lines, and the like, are well established as are methods for extracting objects from an image. A size of the object identified is also determined. Size of text characters can be readily ascertained. Objects can be extracted so that a size of can be determined. In various embodiments, the size of the object is in pixels. Size also may be based upon a volume of the object. Methods for determining a size of an object, as defined above, are well known. In one embodiment, a virtual or actual frame is put in place about the object. The frame may be of any shape necessary to surround the object. The frame may advantageously include only a single object in order that processing may be undertaken to determine whether any edges of the object should be dilated. Alternatively, object identification such as, for example, object size, color, and/or specific edges intended to be dilated using the techniques disclosed herein may be entered by a user using, for instance, the user interface of the computing platform shown in FIG. 2. One embodiment takes the form of a user selecting an edge via an expandable rubber-band box using a pointing device such as a mouse. Since one object may overlay another, portions of a background underneath an object determined to be in the foreground thereof may comprise one or more objects. At least one reverse object or reverse fine object is identified in the document image and a size of the object is obtained.

Generally, a received document image is first decomposed using any of a variety of well known techniques and flattened and rasterized. Thereafter, a determination can be made as to which objects are in the foreground and the color of a background beneath the object. One of ordinary skill would appreciated that many digital front ends (DFEs) of multifunction devices, such as those illustrated in the embodiment of FIG. 2, can recognize objects embedded in PDL masters, for example, text, lines, stroke, fills, and the like. Recognized objects can be analyzed, characterized, extracted, processed, and the like, in a plurality of ways. Further, additional information about objects used to optimize the processing of contone data, such as rendering hints and tags, may further be provided to the print engine thereby enabling the print engine to optimally render the objects.

At step 306, an amount of maximum base dilation, $D_{max}$, is determined for the reverse object. The maximum base dilation represents the maximum amount that the object can be dilated when the reverse object is placed on top of a highlight background. One embodiment of a maximum base dilation is described in the definitional section above. The maximum base dilation amount may be pre-defined or pre-set by a user and retrieved in response to a user input using, for instance, the example computing platform 200 of FIG. 2 over a network in a networked document reproduction environment. User-selectable pull-down menus may also be employed to provide one or more values used in the determination of the maximum base dilation amount. The maximum amount of dilation may be identified by the object itself relative to surrounding objects, or retrieved from a memory or storage device.

At step 308, a size-dependent dilation amount, $D_{sd}$, is determined. The size-dependent dilation amount is based upon a size of the reverse object and the maximum base dilation amount, $D_{max}$ determined in step 306, and represents an amount of an additional dilation to be applied to an edge when the background is in the range of a highlight color. One embodiment for determining the amount of size-dependent dilation are provided in Eqs. (1)-(3). The size-dependent dilation is determined relative to an upper and lower size threshold. Acquiring the upper and lower size thresholds may be accomplished by, for example, referencing a stored database of such values that have been pre-determined and/or stored within an image forming device or image processing system to be referenced for rendering when fine lines and/or small text font characters are to be reverse printed, or in any other situation where such values may prove advantageous to improving image quality. Alternatively, the upper and lower size thresholds are acquired, for example, via a user input in response to a query displayed on, for example, a graphical user interface. The user input may be processed by the image output device that will render the image with various image quality attributes having been preset or pre-adjusted to ensure that fine-featured objects, such as fine lines and small text, are visible or are otherwise readable on the output image media. These values may have also been optimized for a given object type or for a given set of objects.

At step 310, determine an amount of a gamma-corrected background density. Gamma correcting the background density means raising the background density to the power of a tone-dependent gamma correction factor. In this application, Gamma value is optimized such that for a fine feature with a fixed width before dilation, after applying the size-dependent amount and tone-dependent compensation factor, the final dilated object appear to have a consistent width disregarding the background color. A value for the tone-dependent gamma correction factor or a value for the gamma-corrected background density may alternatively be provided by a user via a user interface or retrieved from a storage device or a memory.

At step 312, determine an amount of a maximum additional dilation, $D_{add}$. In most cases, dilation solely provided by size-dependent dilation amount, which is optimized for the highlight background, is not sufficient to compensate the fill-artifact when the background color is nearly saturated. Therefore, it is necessary to introduce an additional dilation. The amount of maximum additional dilation, $D_{add}$, represents the maximum additional dilation that the reverse object can be dilated when the reverse object is on top of the darkest possible shadow background. Values for the amount of maximum additional dilation may be provided by a user via a user interface or retrieved from a storage device or memory.

At step 314, a tone-dependent compensation factor is determined. As discussed above with respect to Eq. 5, the tone-dependent compensation factor, TDCF, is based upon the maximum base dilation amount, $D_{max}$ of step 306, the amount of size-dependent dilation amount $D_{sd}$ of step 308, the gamma-corrected background density of step 310, the maximum additional dilation amount of step 312. One embodiment of the tone-dependent compensation factor is describe above with respect to Eq. (5). The tone-dependent compensation factor may alternatively be provided by a user or retrieved from a storage device or a memory.

At step 316, an amount of a total dilation, $D_{total}$, is calculated based upon the tone-dependent compensation factor determined in step 316 and the size-dependent dilation amount determined in step 308. The amount of total dilation is given in pixels. One example embodiment of the total dilation amount is described above with respect to Eq. (6).

At step 318, dilate pixels along the edge of the reverse object by the amount of total dilation calculated in step 316. The pixels in the dilated area either fully or partially adjusted. Dilating the edge of the reverse object by the amount of total dilation comprises, in one embodiment, adding a number of whole pixels equivalent to a real portion of the total dilation amount and adding a partial pixel equivalent to a fractional portion of the total dilation amount. The calculated total dilation amount is a floating point number having a whole number portion and a decimal portion. For example, the floating point number 5.2 has a whole number portion of 5 and a decimal portion of 2. In this example, the object will be dilated by 5 whole pixels plus by a partial pixel equivalent to ²⁄₁₀ of a whole pixel. The decimal portion of the total dilation amount may be zero or rounded.

In one example embodiment, values of contone pixels in the dilated area are modified according to the following set of rules:

If $|i| \leq \text{floor}(D_{total})$, then the new contone value at the $i^{th}$ pixel=0.

If $(|i|=\text{ceiling}(D_{total})$ and $(i>D_{total}))$ then new contone value at $i^{th}$ pixel=original contone value·[ceiling$(D_{total})-D_{total}]$.

Partially modified contone pixels are preferably halftoned with high addressability screens, while unmodified background pixels outside of the frame are halftoned with the base halftone screens (e.g., 175 dpi dot). An additional logic is able to determine if a left or right justified line screen should be used based upon whether the transition area is a left or right edge.

At step 320, a determination is made whether any more reverse objects remain to be processed. If so, then processing returns to step 304 wherein a next reverse object in the document image is identified. Processing repeats until there are no more reverse objects which require dilation. It should be appreciated that processing of the document image can occur on an object-by-object basis. Processing may proceed either serially or in parallel. When a scanline is processed and one or more edges identified, these edges may be added to, for example, a list. Each scanline may consist of a plurality of white runs and non-white runs. Each edge may represent a boundary area between white runs and non-white runs. The method may judge whether a run is white or non-white based upon a contone value of the run. Any run having a contone value below, for example, a set value may be defined as white. Any run having a contone value above the set value may be defined as non-white. Each edge of interest may have a size associated with the reverse object in pixels. Once the event list for the scanline is propagated, an iterative loop within the process may commence. Alternatively, an additional determination is made whether every edge within the scanline has been processed and the method iteratively repeated until every edge has been processed. Once all the reverse objects have been processed in accordance herewith, processing stops at step 322. The processed document image may then be provided to an image output device wherein the image is rendered. The image may be stored to a storage device or communicated over a network. Thereafter, further processing stops.

It should be appreciated that any of the above-described determinations may be performed in specialized software or a computer processing unit (CPU) which executes machine readable program instructions for carrying out the determinations hereof. It should further be appreciated that the present method is directed towards processing an image such that fine line and/or small text font character of reverse objects are sharp, crisp, and readable when the image is output. As such, any of the steps described with respect to the flow diagram of FIG. 2 may be implemented as subroutines to image formation, image production, and/or image reproduction, in any manner, and particularly those in which hardcopy output images are formatted for formation, production, and/or reproduction on output image receiving media. It should be appreciated that individual scanlines may be immediately processed. Individual scanlines intended to be processed may be optionally stored in sequence on a non real-time or real-time basis depending on the speed of the scan and the speed and/or size of the memory or storage device required to store the scanline sequences. Temporary storage of data of various steps may facilitate flexibility in processing as will be undertaken by subsequent steps in the method.

Example Dilation of Reverse Object

Figure 4:
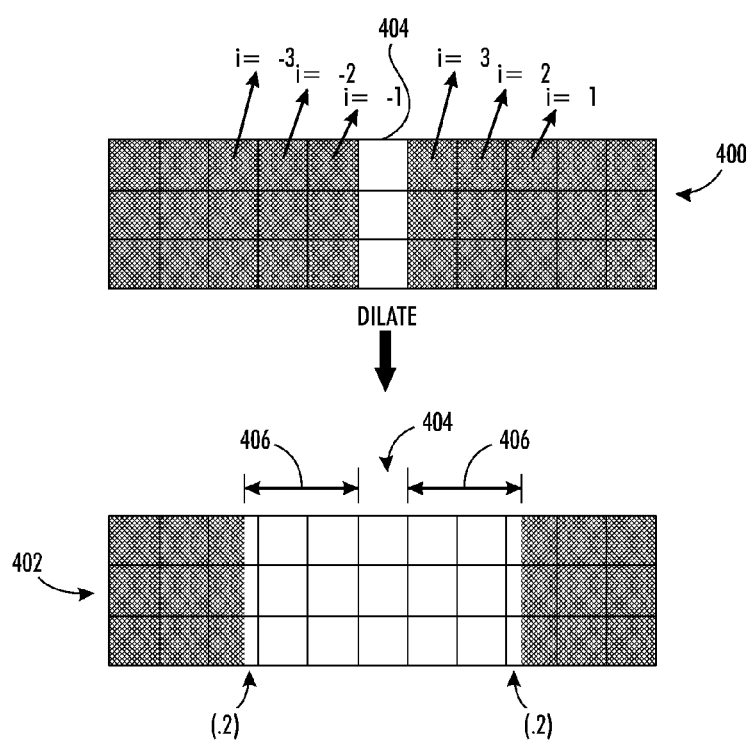
FIG. 4 is an illustration of an example cluster of pixels representing a small segment of a much larger document image having a region of transition wherein pixels of a reverse object, shown at 404, is to be dilated by an amount of total dilation calculated in a manner as shown and discussed with respect to the flow diagram of FIG. 3.

Reference is now being made to FIG. 4 illustrating an example single pixel-wide reverse object dilated to produce a new object of size 5.4 pixels.

A cluster of pixels, collectively at 400, represents a small segment of a much larger image of a document having a region of transition. Pixels of a reverse object, shown as pixel row 404, is to be dilated by an amount of total dilation, $D_{total}=2.2$, calculated in a manner as shown and discussed with respect to the flow diagram of FIG. 2. The total amount of dilation is a floating point number having a whole number portion equal to 2, and a decimal portion equal to 0.2. Pixels have been added along each side of row 404 by an amount equivalent to 2 whole pixels (per side) and by a fractional pixel equivalent to 0.2 pixel (per side) for a total amount of dilation equal to 2.2, collectively shown per side at 406 in dilated region 402. Assuming the background colors on each side of the reverse object are the same, a total of 2×2.2=4.4 pixels have been added along each side of the edge (single pixel-wide edge). As a result, the single pixel-wide reverse object 404 now comprises a total of 5.4 pixels (1+2.2+2.2).

Example Image Processing System

Figure 5:
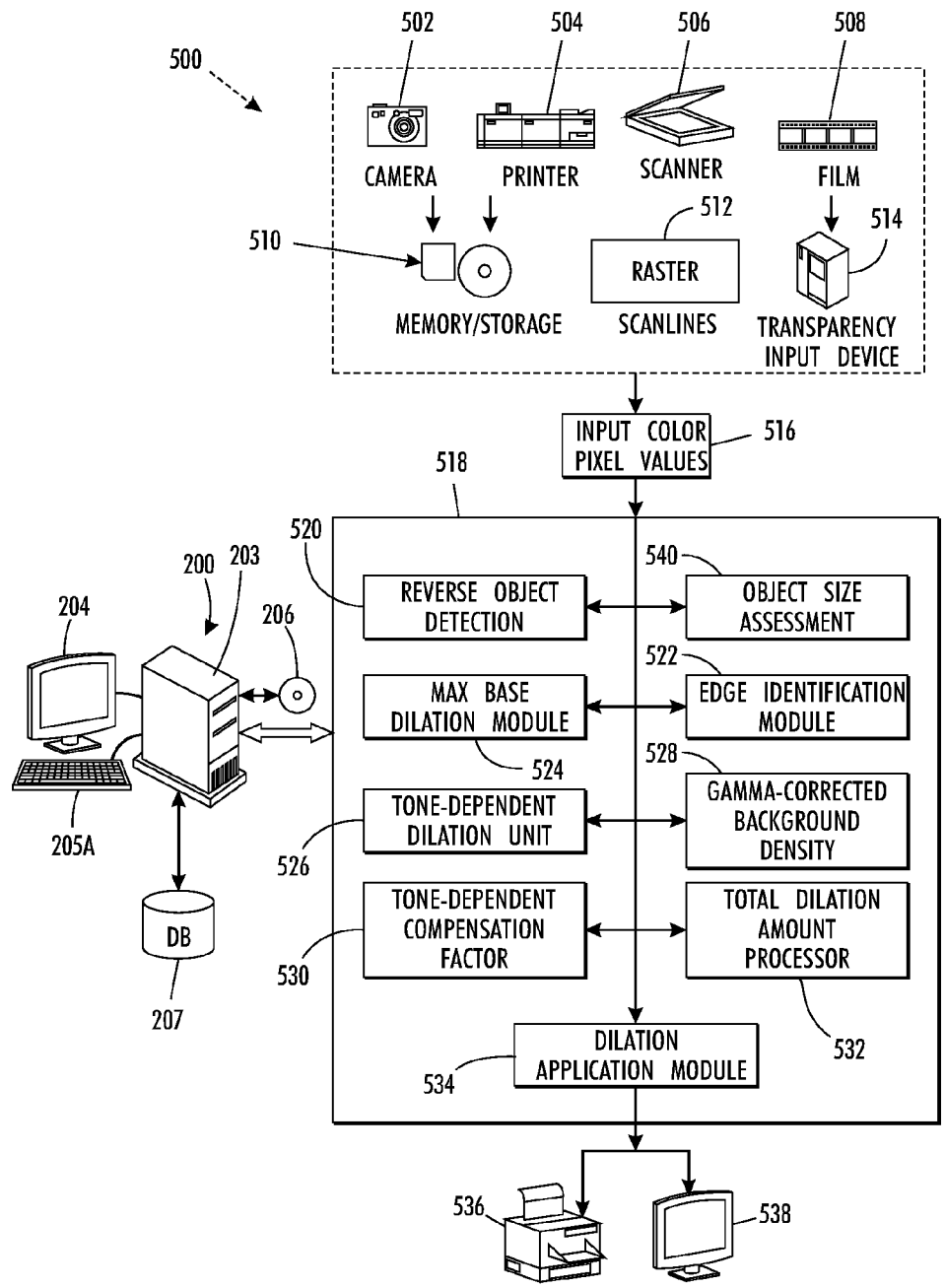
FIG. 5 illustrates a schematic block diagram of one example image adjustment system for implementing various aspects of the present method for determining an amount of a total dilation to be applied to an edge of a reverse object to reduce fill-in artifact effects according to the flow diagram of FIG. 2 and shown in the example dilation embodiment of FIG. 4.
Figure 6:
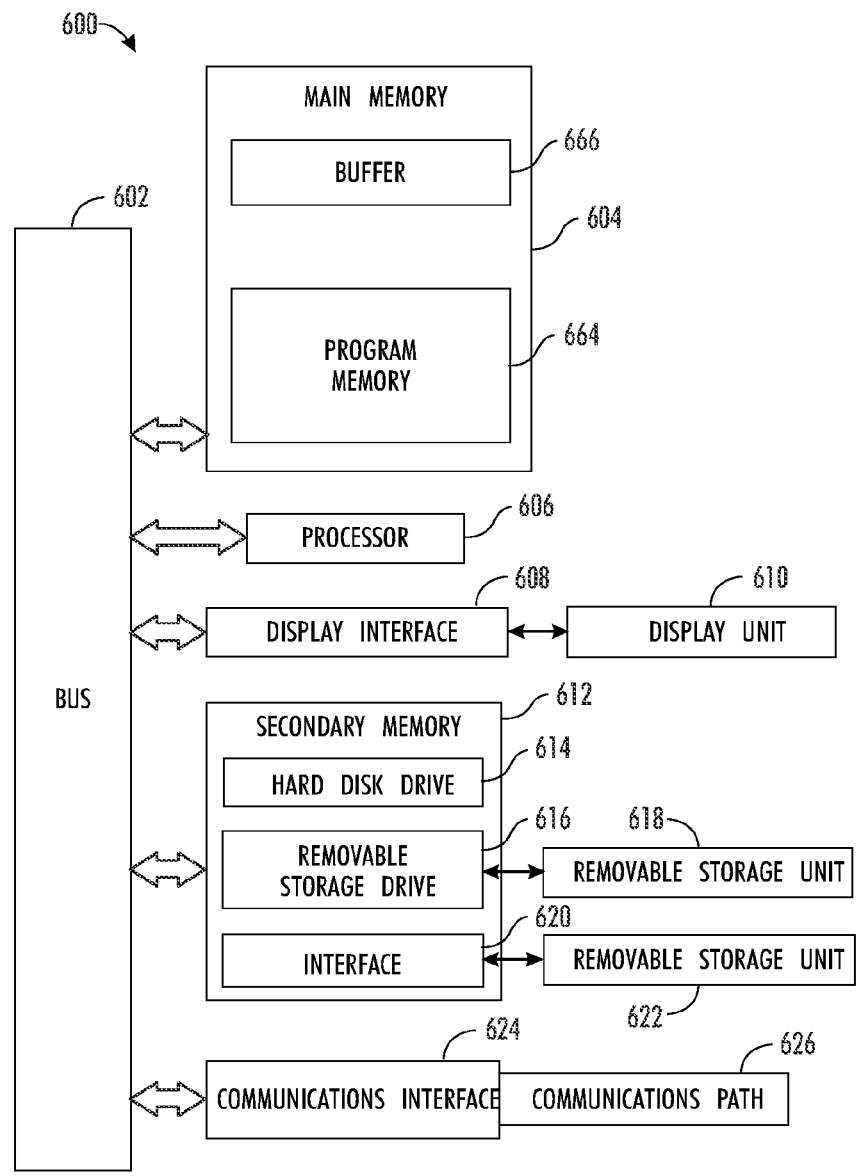
FIG. 6 which illustrates a block diagram of one example embodiment of a special purpose computer system for performing one or more aspects of the present system and method as described with respect to the example flow diagram of FIG. 3 and the example functional block diagram of FIG. 5.

Reference is now being made to FIG. 5 which illustrates one example image adjustment system for implementing various aspects of the present method for determining an amount of a total dilation to reduce fill-in artifact effects in a color image according to the flow diagram of FIG. 2 and shown in FIG. 4. It should be appreciated that various modules of the schematic of FIG. 5 designate a system component which may comprise software and/or hardware designed to perform a specific function. A plurality of modules may collectively perform a function. A module may have specialized processor capable of reading machine executable program instructions. A module may comprise a single piece of hardware such as an ASIC, electronic circuit, or special purpose computer system such as is shown in FIG. 6. A plurality of modules may be executed by either a single special purpose computer system or a plurality of special purpose computer systems in parallel. Connections between modules includes both physical and logical connections. Modules may further include one or more software/hardware modules which may further comprise an operating system, drivers, device controllers, and other apparatuses some or all of which may be connected via a network.

A source document image may be captured in a plurality of ways, shown collectively at 500. The source image may be captured by a digital camera 502 and transferred via a USB connection. The source image may be captured using a printer 504, or a scanning device 506 and the input color data values transferred via a cable over a network. A storage device 510 such as a floppy disk or a compact disk may contain the source document image and retrieved therefrom. The source document image may be received from Raster Image Processor 512 and transmitted in the form of scanlines. The source document image may comprise a light-sensitive material of a color or monochrome negative film read by transparency film reading device 514. The received document image comprises a plurality of input color data points 516. The color data points, representing the received document image, are provided to image adjustment system 518. Alternatively, input images may be decomposed in a line-by-line manner. For example, a page of a page description language (PDL) document may be decomposed and the objects within the page flattened and rasterized. A moving window may be made to translate along a raster scanline to process rasterized data within the window such that processing of such scanned input image data on a real time basis may be undertaken.

The image adjustment system 518 is capable of executing various aspects of the present method and performing other functionality as will be described herein further. Any of the modules shown therein may reside in computer system 200, as shown and discussed with respect to the network environment of FIG. 2, as hardware and/or software and carry out processing in accordance herewith on the received document image. Image adjustment system 518 may further carry out processing on the basis of commands received from computer workstation 200 or which have been received over a communication network (not shown). Various specialized image processing applications may additionally be performed by computer system 200 to facilitate or effectuate any of the processing performed by the image adjustment system 518. System 518 may be connected to a server via a network such as a LAN, a WAN, or the like, through which the input color data 516 is transmitted and received. The image processing may be provided as a general structure having an external memory, or as a special purpose computer as discussed herein further.

Reverse object detection module 520 detects at least one reverse object in the received document image. Such a module may further comprise an electronic switch or flag, if no reverse objects are detected, or if there are no regions of transition which require processing, or if image quality is not sufficient enough to be of a concern, the entire image process may be bypassed. This may be advantageous in those document processing environments where throughput and processing time is a primary concern. A pre-process that detects small reverse objects may be implemented as an indicator for this switch or flat. Such a capability to receive a user input from computer 200 may facilitate improved image processing and adjustment of image quality within image adjustment system 518. Such a capability may further afford an opportunity to, for example, input size thresholds $T_{lower}$ and/or $T_{upper}$, or directly input a maximum dilation amount $D_{max}$ to be used in rendering and forming particularly fine line and small text font reverse images on output image receiving media. In other embodiments, a controller or dedicated processor may be provided to control overall operation of the image adjustment system, or otherwise to specifically control individual functions relating to adjusting image quality. Such a controller may further query database 207 for data values required for processing or store data values determined during processing. The database may further retrieve instructions for carrying out various operations based on determinations made in other modules within the image adjustment system, particularly those related to improving image quality regarding fine line and/or small text font reverse image formation on an output image receiving medium. Such a controller may also process image data and monitor parameters received making determinations automatically within the image adjustment system that will support optimum image quality adjustment based on, for example, a size of a small text font character intended to be produced and/or reproduced, or the width of a fine line intended to be produced and/or reproduced.

Database 207 stores data regarding operating parameters and/or a range of parameters. Such parameters may not change over time, or may be subject to routine update as may be appropriate to improve image quality particularly with respect to production and/or reproduction of fine lines and/or small text fonts in reverse image production and/or formation. Storage devices in communication with computer system 200 may additionally store, for example, any manner of preset data to which system 518 may refer in producing and/or reproducing images on output image receiving media. As such, storage space may be available for all modules of the system 518. There may be provision for a database storing section to store one or more operating parameter databases. Storage devices may contain, for example, ranges of threshold data to be referenced based on a detected size of a small text font, or detected width of a fine line to be produced and/or reproduction within the image forming device. Storage devices may store optimally determined thresholds for a particular image forming device and/or threshold cross-over points to aid in making a determination when certain automatic image quality adjustment should be applied to image data to render an optimally visible and/or readable output image.

An object size assessment module 540 and an edge identification module 522 may be included as separate units. Alternatively, these functions are combined in a single unit or module. In various embodiments, a sliding and/or moving window of a certain size may be applied to review each scanline of input image data 516 to facilitate the determination of a width of a particular line or a size of a particular character of small text font character. Such determinations may be made, for example, by causing movement of a window along a raster scanline in a pre-determined direction to process rasterized data within the window. Inside the moving window, a region of transition such as a color-to-white or white-to-color interface may also be detected. If there are any color-to-white or white-to-color interfaces, the white-rasterized portion may be identified as including one or more edges at the interface between the white portion and the color portion. These interfaces may be identified specifically as edges. Such edges may be further identified as events in accordance with the above-described methods in order that some determination may be made whether such edges and/or events require further processing, such as, for example, adding a dilation effect to such edges and/or events. As part of the edge identification undertaken by a combined unit or a separate edge identification unit, an assessment of object size may be undertaken by a combined unit or by a separate object size assessment module. Whether undertaken separately or as part of a combined unit, a size of an object within the moving window may be determined in order that a comparison may be made to one or more thresholds which may be any one of pre-determined, pre-stored, or user-selected or user-provided.

A max base dilation amount determining module 524 may reference information available from one or more of the object size assessment unit 540, the edge identification unit 522, and may be obtained from the computer workstation 200 in any one of several manners. Size-dependent dilation processing module 526 receives information from the max dilation amount module 524 and the object size assessment unit 522 to determine the amount of tone-dependent dilation in a manner more thoroughly described above. Gamma-corrected background density unit 528 applies the gamma correction to the background density in a manner discussed above. Tone-dependent compensation factor module 530 determines the amount of tone-dependent compensation from, in part, the gamma-corrected background density received from module 528. The total dilation amount processing module 532 scales the amount maximum base dilation received from module 524 by the amount of tone-dependent compensation factor from module 530 to produce an amount of total dilation, in a manner described above and provides the amount of total dilation to dilation application module 534. Information or other data values needed or produce by any of the modules (or units) described herein may be stored or retrieved from any of the other modules or units or from computer system 200 or over a network not shown.

Within the dilation application module, a determination may be made whether an edge should be processed, for example, dilated, in order to enhance visibility and/or readability of a fine line based on the width of the fine line, or a character of small text font based on the size of such character as may be determined by, for example, an object size assessment unit 540. Such dilation may involve individual pixels, or otherwise simply portions of individual pixels in order to modify the transition between the white-to-color or color-to-white edges identified within each object by, for example, an edge identification module 522. Dilation application unit 534 specifically applies a total dilation amount determined by total dilation amount processing unit 532 prior to the output image data being property formatted in, for example, an output image device 536. The intent of the interaction between the above-identified modules/units is to adjust image quality parameters within the image adjustment system 518 in order that image quality adjustment may be modified as required, or a separate methodology may be undertaken, in order to attempt to ensure that small width fine lines and/or small text font characters are visible and/or readable when formed, produced and/or reproduced on an output image receiving medium via an image sink (not shown), perhaps at the expense of image sharpness. The methods described herein contemplate an image sink that is an output image receiving medium upon which a hard-copy image may be formed. Such image sinks may include, for example, additional display for review of an output image, and for evaluation of image quality based on, for example, image quality adjustment including edge dilation of fine lines or small text fonts to be produced and/or reproduced in the image forming device, may be employed. After processing, the adjusted document image is provided to an image output device for rendering such as, for example, print device 536 and/or display device 538.

It should be appreciated that although generally depicted as an integral system, each of the devices and/or units (depicted as internal to, or alternatively externally connected to, system 518) may be either units and/or capabilities internal to an image forming device, or individually, or in combination, attached as separate units by any path that facilitates data communication (such as, for example, digital data communication of image data information, and coordination) between such units and/or devices by one or more data/control buses.

Such data/control buses, and/or otherwise data communication, may be undertaken by, for example, one or more of a wired, a wireless, an optical, or other like connection; either individually or via some form of network communication between the individual devices and/or components and the overall system supporting image formation in an image forming device.

Any of the data storage units depicted, or alternatively described above, may be implemented using an appropriate combination of alterable, volatile or non-volatile memory, or non-alterable, or fixed memory. The alterable memory, whether volatile or non-volatile, may be implemented using any one or more of static or dynamic RAM, or, for example, any computer-readable type media and compatible media reader, a hard drive, a flash memory, or any other like memory medium and/or device. Similarly, a non-alterable or fixed memory may be implemented using any one or more of ROM, PROM, EPROM, EEPROM, optical or other disk such as, for example, CD-ROM, SDVD-ROM, blue ray or other disk type media and compatible disk drive, or any other like memory storage medium and/or device.

Example Special Purpose Computer

Reference is now being made to FIG. 6 which illustrates a block diagram of one example embodiment of a special purpose computer system for performing one or more aspects of the present system and method as described with respect to the example flow diagram of FIG. 3 and the example functional block diagram of FIG. 5. Such a special purpose processor is capable of executing machine readable program instructions for carrying out one or more aspects of the present method and may comprise any of a micro-processor or micro-controller, ASIC, electronic circuit, or special purpose computer system. Such a system can be integrated, in whole or in part, with a xerographic system, color management system, or image processing system, or any of the devices of the networked environment of FIG. 2. All or portions of the flow diagram of FIG. 3 and the functional block diagram of FIG. 5, as illustrated and described herein, may be implemented partially or fully in hardware in conjunction with machine executable instructions in communication with various components of such a system.

Special purpose computer system 600 includes processor 606 for executing machine executable program instructions for carrying out all or some of the various aspects of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores program instructions. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 further includes other mechanisms for allowing programs or other machine executable instructions to be loaded into the processor. Such mechanisms may include, for example, a storage unit 622 adapted to exchange data through interface 620 which enables the transfer of software and data to the processor. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

It should be appreciated that, given the required inputs, to include, but not be limited to, appropriate information regarding thresholds and/or dilation parameters, as generally described above, and/or inputs regarding different capability for image adjustment particularly with regard to image formation, production and/or reproduction of fine line images and/or small text font characters within the image adjustment system 518, software algorithms, hardware/firmware circuits, or any combination of software, hardware and/or firmware control elements may be used to implement the individual devices and/or units the system of FIG. 5, or the individual units and/or devices in varying combinations as are described in general above.

The computations necessary to establish and/or to determine adjustment of individual image formation parameters such as, for example, selection from among the individual available thresholds and/or dilation parameters, may be implemented within a circuit in the image forming device itself. Alternatively, such computations may be performed on a programmable general purpose computer, special purpose computer, program microprocessor or microcontroller, or other like digital signal processing devices. These other like digital signal processor may include, but are not limited to, peripheral integrated circuit elements, ASIC, or other integrated circuits, hard-wired electronic or logic circuit, such as, for example, discrete element circuits, programmable logic devices such as PLD, PLA, FGPA or PAL or the like, or may even be manipulated through manual adjustment of one or more operating parameters and/or user-adjustable input parameters that may be associated with one or more of the operating parameters of the system of FIG. 5.

It should be appreciated that various of the above-disclosed and other features and functions, or alternatives thereof, may be desirably combined into many other different systems or applications. The above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims.

Accordingly, the embodiments set forth above are considered to be illustrative and not limiting.

Various changes to the above-described embodiments may be made without departing from the spirit and scope of the invention. The teachings of any printed publications including patents and patent applications are each separately hereby incorporated by reference in their entirety.

What is claimed is:

1. A method for determining an amount of dilation to be applied to pixels along an edge of a reverse object to compensate for a fill-in artifact effect in a color image, the method comprising:

receiving a document image from an image input device;
    identifying, in said document image, at least one reverse object having at least one edge comprising pixels in a region of transition;
    determining an amount of a maximum base dilation, $D_{max}$;
    determining an amount of a size-dependent dilation, $D_{sd}$;
    determining a tone-dependent compensation factor, TDCF, as a function of a gamma-corrected background density, $(B_d)^\gamma$;
    scaling said amount of size-dependent dilation by said tone-dependent compensation factor to obtain an amount of total dilation, $D_{total}$, in pixels; and
    dilating pixels in said region of transition by said amount of total dilation.

2. The method of claim 1, wherein said received document image comprises a scanline of said document image.

3. The method of claim 1, further comprising determining a background density, $B_d$, comprising:

$$B_d=(\text{digital count})/255,$$

where digital count represents a background color of said region of transition with 0 being lightest and 255 being darkest.

4. The method of claim 3, wherein said tone-dependent compensation factor comprises:

$$TDCF=1+[D_{add}/D_{sd}]\cdot(B_d)^\gamma,$$

where $D_{sd}$ represents said size-dependent dilation amount, $D_{add}$ represents an amount of a maximum dilation that said reverse object can be dilated when said object is on top of a darkest possible shadow background, $\gamma$ represents a tone-dependent gamma correction determined for a given color separation, and $(B_d)^\gamma$ is said gamma-corrected background density.

5. The method of claim 1, wherein scaling said maximum base dilation by said tone-dependent compensation factor to obtain said total dilation, $D_{total}$, comprises:

$$D_{total}=D_{sd}\cdot TDCF.$$

6. The method of claim 1, wherein dilating pixels in said region of transition comprises adding a number of whole pixels equivalent to a whole number portion of said total dilation and adding a partial pixel equivalent to a decimal portion of said total dilation.

7. The method of claim 1, further comprising providing said document image to an image output device wherein said image is rendered.

8. A system for determining an amount of dilation to be applied to pixels along an edge of a reverse object to compensate for a fill-in artifact effect in a color image, said system comprising:

a memory;
    a storage medium for storing data; and
    a processor in communication with said storage medium and said memory, said processor executing machine readable instructions for performing the method of:
    receiving a document image from an image input device;
    identifying, in said document image, at least one reverse object having at least one edge comprising pixels in a region of transition;
    determining an amount of a maximum base dilation, $D_{max}$;
    determining an amount of a size-dependent dilation, $D_{sd}$;
    determining a tone-dependent compensation factor, TDCF, as a function of a gamma-corrected background density, $(B_d)^\gamma$;
    scaling said size-dependent base dilation by said tone-dependent compensation factor to obtain an amount of total dilation, $D_{total}$, in pixels; and
    dilating pixels in said region of transition by said amount of total dilation.

9. The system of claim 8, wherein said received document image comprises a scanline of said document image.

10. The system of claim 8, further comprising determining a background density, $B_d$, comprising:

$$B_d=(\text{digital count})/255,$$

where digital count represents a background color of said region of transition with 0 being lightest and 255 being darkest.

11. The system of claim 10, wherein said tone-dependent compensation factor comprises:

$$TDCF=1+[D_{add}/D_{sd}]\cdot(B_d)^\gamma,$$

where $D_{sd}$ represents said size-dependent dilation amount, $D_{add}$ represents an amount of a maximum dilation that said reverse object can be dilated when said object is on top of a darkest possible shadow background, $\gamma$ represents a tone-dependent gamma correction determined for a given color separation, and $(B_d)^\gamma$ is said gamma-corrected background density.

12. The system of claim 8, wherein scaling said size-dependent base dilation by said tone-dependent compensation factor to obtain said total dilation, $D_{total}$, comprises:

$$D_{total}=D_{sd} \cdot TDCF.$$

13. The system of claim 8, wherein dilating pixels in said region of transition comprises adding a number of whole pixels equivalent to a real portion of said total dilation and adding a partial pixel equivalent to a fractional portion of said total dilation.

14. The system of claim 8, further comprising providing said document image to an image output device wherein said image is rendered.

15. A computer implemented method for determining an amount of dilation to be applied to pixels along an edge of a reverse object to compensate for a fill-in artifact effect in a color image, the method comprising:

receiving, from an image input device, a document image;

identifying, in said document image, at least one reverse object having at least one edge comprising pixels in a region of transition;

determining an amount of a maximum base dilation, $D_{max}$, that said at least one edge of said reverse object can be dilated;

determining an amount of a size-dependent dilation, $D_{sd}$, representing an amount of base dilation to be applied to said edge of said reverse object when a background color in said region of transition is in a range of a highlight color;

determining a background density, $B_d$, of a background color of said region of transition;

determining an amount of a maximum dilation, $D_{add}$, that said reverse object can be dilated when said reverse object is on top of a darkest possible shadow background;

applying a gamma correction to said background density to produce a gamma-corrected background density, $(B_d)^\gamma$, where $\gamma$ is a tone-dependent gamma correction determined for a given color separation;

determining an amount of a tone-dependent compensation factor, TDCF, as a function of said gamma-corrected background density;

scaling said size-dependent base dilation by said tone-dependent compensation factor to obtain an amount of a total dilation, $D_{total}$, in pixels; and dilating pixels in said region of transition by said amount of total dilation.

16. The method of claim 15, wherein said background density comprises:

$$B_d=\text{(digital count)}/255,$$

where digital count represents a background color of said region of transition with 0 being lightest and 255 being darkest.

17. The method of claim 16, wherein said tone-dependent compensation factor comprises:

$$TDCF=1+[D_{add}/D_{sd}] \cdot (B_d)^\gamma.$$

18. The method of claim 15, wherein scaling said maximum base dilation by said size-dependent compensation factor to obtain said amount of total dilation comprises:

$$D_{total}=D_{sd} \cdot TDCF.$$

19. The method of claim 15, wherein dilating pixels in said region of transition comprises adding a number of whole pixels equivalent to a real portion of said total dilation and adding a partial pixel equivalent to a fractional portion of said total dilation.

20. The method of claim 15, further comprising providing said document image to an image output device wherein said image is rendered.

* * * * *